Figure 1:
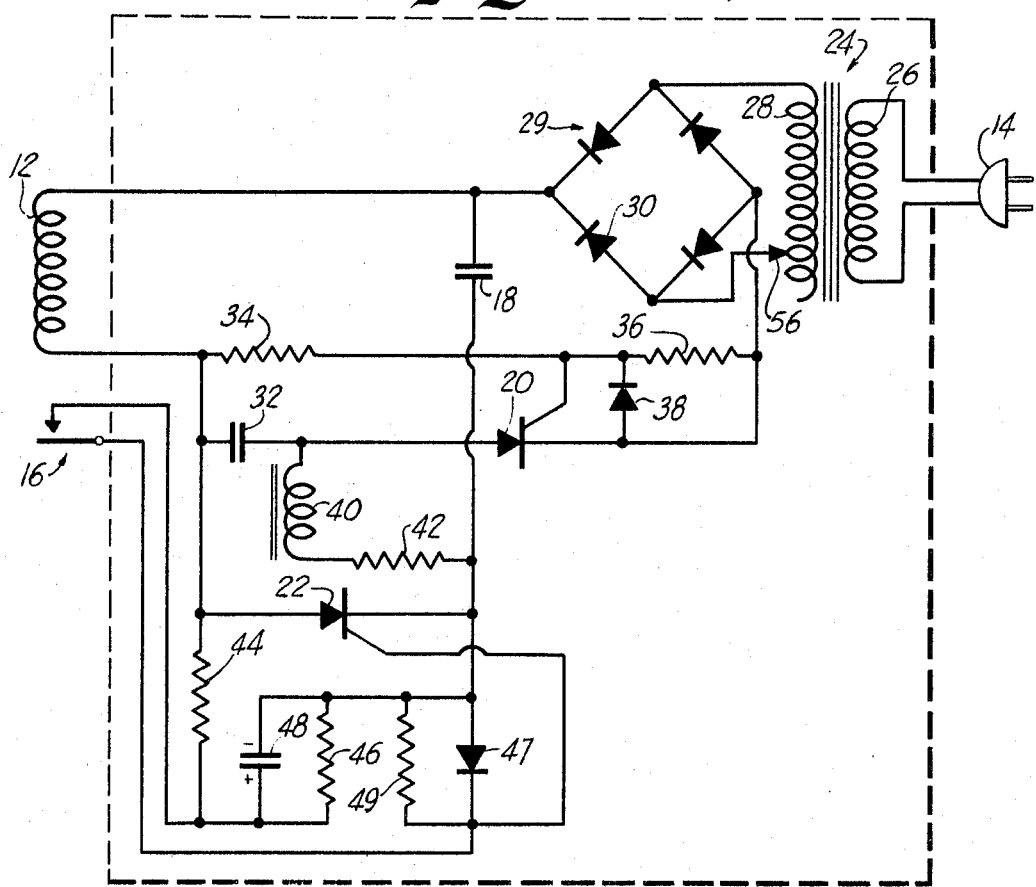

Nov. 29, 1966 R. H. DOYLE ETAL 3,289,064
ENERGY SUPPLY CIRCUIT
Filed Dec. 22, 1961

INVENTORS
RICHARD H. DOYLE,
LEROY N. HERMANN
AND JOSEPH S. NABER
BY
Mason, Kolehmainen, Rathburn and Wyss
ATTORNEYS.

United States Patent Office 3,289,064
Patented Nov. 29, 1966

3,289,064
ENERGY SUPPLY CIRCUIT
Richard H. Doyle, Mount Prospect, Joseph S. Naber, Wheeling, and Le Roy N. Hermann, St. Charles, Ill., assignors to Fastener Corporation, Franklin Park, Ill., a corporation of Illinois
Filed Dec. 22, 1961, Ser. No. 161,653
12 Claims. (Cl. 320—1)

This invention relates to an energy supplying circuit and, more particularly, to a new and improved circuit for supplying energy from a potential source to a load through an intermediate capacitive means.

There are many different types of equipment that require, for their proper operation, the delivery of a relatively large amount of electrical power during a rather short time interval. In electric spot welding apparatus, for instance, it is necessary to supply a large amount of electrical energy to the welding electrodes, and the period over which the energy is delivered must be very short to produce the desired fusion of the metal. Similarly, in electrically operated staplers or tackers in which a fastener driving blade is electromagnetically actuated to engage and set a fastener, it is desirable to supply a high power pulse of a short duration to an operating winding so that the blade is provided with a single power impulse and the power loss due to heating is reduced to a minimum.

One very useful method of supplying high energy pulses of short duration involves the controlled discharge of capacitive means into the load circuit. However, many prior capacitive charging and discharging circuits lack sufficient control over the charging and discharging cycles, are extremely heavy and unsuitable for use with portable equipment, and are so slow in response that excessive heating occurs with the attendant energy loss and heat dissipation problems.

Accordingly, one object of the present invention is to provide a new and improved circuit for supplying energy to a load.

Another object is to provide a capacitor charging and discharging circuit including new and improved means of controlling the capacitor charging and discharging cycles.

A further object is to provide an energy supplying circuit in which the transfer of energy from a potential source to a load through an intermediate capacitive means is controlled by a plurality of controlled conduction devices.

Another object is to provide a circuit for controlling the charging of a capacitor in which the transfer of energy to the capacitor through a controlled conduction device is commutated by the waveform of the charging potential.

Another object is to provide a capacitor charging and discharging circuit including new and improved means for rendering a capictor charging means ineffective during the discharge of the capacitive means.

In accordance with these and many other objects, an embodiment of the invention comprises a control circuit including a storage capacitor which is charged by pulsating signals of unidirectional potential from a potential source and which is discharged into a load device such as the winding of an electrically operated stapler or tacker. To provide means for controlling the charging of the capacitive means, a first controlled conduction device, such as a gated silicon rectifier, is connected between the potential source and the capacitive means. The gate of the controlled rectifier is supplied with an input signal proportional to the charge on the capacitive means on which the pulsating signals from the potential source are superimposed. In this manner, the first controlled conduction device connects the capacitive means to the potential source until the capacitive means is charged to the desired potential.

The capacitive means is discharged to the load through a second controlled conduction device, such as a controlled silicon rectifier, having a gate or control electrode. This control electrode is connected to a capacitor charged to a voltage proportional to the voltage across the capacitive means by a manually actuated switch so that the operation of the switch places the second controlled conduction device in a conductive state to connect the capacitive means in series with the load device or winding.

The conduction of the second controlled conduction device places the first controlled conduction device in a nonconductive state so that the discharging circuit is isolated from the charging circuit and the potential source. When the charge across the capacitive means has dissipated to a predetermined level, the pulsating signals from the potential source supplied to the control element of the first controlled conduction device place this device in a conductive state to initiate the recharging of the capacitive means and to place the second controlled conduction device in a nonconductive state until the capacitive means is next to be discharged.

Figure 2:
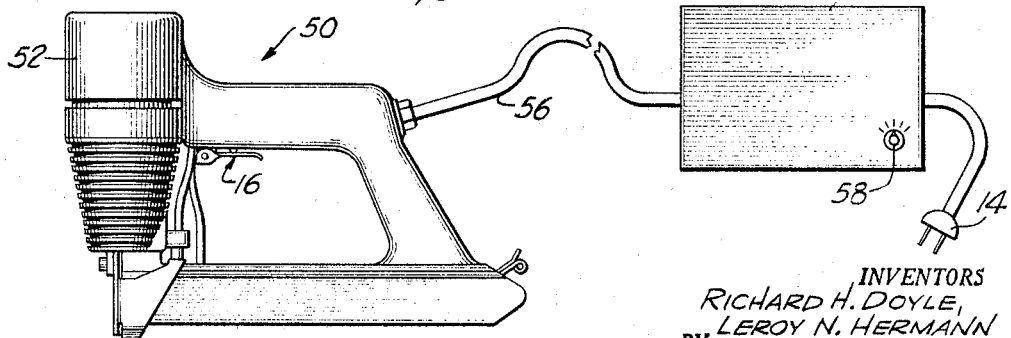

Many other objects and advantages of the present invention will become apparent from considering the following detailed description in conjunction with the drawings, in which:

FIG. 1 is a circuit diagram of an energy supplying circuit embodying the present invention; and FIG. 2 is an elevational view of an electrically operated tacker or stapler with which the control circuit shown in FIG. 1 can be used.

Referring now more specifically to FIG. 1 of the drawings, therein is shown a control circuit, indicated generally as 10, for supplying a high energy pulse of short duration to a load device, such as winding 12. The control circuit 10 is energized or supplied with power from a conventional alternating current line by a plug 14 and is controlled to supply energy to the load device or winding 12 under the control of a single pair of manually or automatically operable contacts in a switching means indicated generally as 16. The control circuit 10 operates to supply energy to the winding or load 12 by charging a capacitive means 18 under the control of a first controlled conduction device 20 and by discharging the accumulated charge from the capacitor 18 into the winding 12 through a second controlled conduction device 22.

The control circuit 10 includes a potential source comprising an input transformer 24 having an input or primary winding 26 connected to the plug 14 and a secondary winding 28 connected to the input of a conventional full-wave rectifier bridge circuit or network 29 including four diodes 30. The transformer 24 used in the control circuit 10 can include the primary winding 26 which is adapted to be connected to a conventional 110–120 volt alternating current power source and the secondary winding 28 which is provided with a plurality of taps to supply an output voltage ranging from 110 to 170 volts varying in increments of 10 volts.

To provide control means for charging the capacitor 18, the first controlled conduction device 20, which can comprise a controlled rectifier having a gate or control electrode, is connected between the output terminals of the bridge circuit 29 in series with the winding 12 and a capacitor 32. The gate or control electrode of the device 20 is connected to a voltage dividing network including a pair of resistance elements 34 and 36 connected between the terminals of the bridge through the winding 12. A diode 38 is connected between the control or gate electrode and the cathode of the controlled rectifier 20 to prevent the application of transient signals in the reverse direction across the control gap of the rectifier 20.

When the control circuit 10 is initially energized and the first pulsating unidirectional signals appear at the output terminals of the bridge circuit 29, the potential drop appearing across the resistance element 36 causes a gate current to flow in the controlled rectifier 20 so that this unit is placed in a conductive state during the positive portions of the pulsating signals supplied by the bridge 29. When the controlled conduction device 20 is placed in a conductive state, the capacitor 32 quickly charges to the full output potential of the bridge 29 through the winding 12, and the capacitor 18 begins to charge over the circuit including the conductive device 20, an inductance or choke 40, and a resistance element 42. In the interval between successive periods of conduction of the device 20, the capacitor 32 discharges into the capacitor 18 over a circuit including the winding 12, the inductance 40 and the resistance element 42. This operation continues until the capacitor 18 is charged to the full output potential of the bridge circuit 29.

When the capacitor 18 is fully charged, the capacitor 32 can not discharge during the period in which the controlled rectifier 20 is in a nonconductive state. Accordingly, the fully charged capacitors 32 and 18 reduce the potential applied across the anode and cathode electrodes of the controlled rectifier 20 to a point at which device 20 cannot be placed in a conductive state. The charge on the capacitor 18 is also applied to a voltage dividing network including the winding 12, a resistance element 44 and a parallel circuit including a resistance element 46 and a capacitor 48. Thus, the capacitor 48 is charged to a potential that corresponds to or is proportional to the potential across the capacitor 18. A diode 47 and a shunting resistor 49 protect the gate-cathode path of the gated rectifier 22 from reversed polarity transient voltages.

When the energy stored in the capacitor 18 is to be discharged into the load device or winding 12, the second controlled conduction device or controlled rectifier 22 is placed in a conductive state and the first controlled conduction device 20 is placed in a nonconductive state. More specifically, when the output energy is to be delivered from the control circuit 10, the contacts 16 are closed to connect the capacitor 48 in series between the cathode of the controlled rectifier 22 and the control or gate electrode thereof. The potential across the capacitor 48 biases the gate electrode positive with respect to the cathode so that a gate current flows. Since the full potential of the capacitor 18, which is equal to or substantially approximates the full output of the bridge circuit 29, is applied between the cathode and anode of the rectifier 22, the flow of gate current places the rectifier 22 in a conductive state to connect the charged capacitor 18 in series with the winding 12. Since this winding has a relatively low ohmic impedance, the charge accumulated on the capacitor 18 is rapidly discharged through the winding 12 to provide a high energy pulse of relatively short duration. The capacitor 32 also begins to discharge over the path including the inductance element 40, the resistor 42 and the conductive device 22.

When the controlled rectifier 22 is initially placed in a conductive state, the capacitors 18 and 32 are connected in series with the anode of the controlled rectifier 20, insofar as the other terminal of the bridge network 29 is concerned, and serve to bias this rectifier in a reverse direction to insure that the rectifier 20 is in a nonconductive state. In addition, the potential to which the capacitor 18 is charged is applied to the left-hand terminal of the resistance element 34 and serves to reduce the potential applied to the gate or control electrode of the controlled rectifier 20 to a point at which this rectifier cannot be returned to a conductive state.

The control circuit 10 remains in this condition with the controlled rectifier 20 in a nonconductive state and the controlled rectifier 22 in a conductive state discharging the capacitor 18 through the solenoid 12 until such time as the charge on the capacitor 18 has been depleted to a predetermined level. As the capacitor 18 approaches a fully discharged condition, the substantially steady-state, negative bias applied to the left terminal of the voltage dividing network including the resistance elements 34 and 36 gradually decreases so that the positive-going pulsations from the output of the bridge network 29 drive the control or gate electrode of the controlled rectifier 20 more positive relative to the potential of the cathode. Further, the charged capacitor 32 is discharging during this interval. When the capacitor 32 has been sufficiently discharged and when the positive-going pulsations from the output of the bridge network 29 drive the gate electrode of the rectifier 20 positive enough to draw the necessary gate current, the controlled rectifier 20 is again placed in a conductive condition to charge the capacitor 32 and to initiate the charging of the capacitor 18.

When the rectifier 20 is first placed in conduction, virtually the entire output potential of the bridge network 29 appears across the series impedance afforded by the inductance element 40 and the resistance element 42. This voltage drop is coupled by the capacitor 32 to the anode of the rectifier 22 causing it to be more negative than the cathode. This places the rectifier 22 in a nonconductive state to terminate the discharging cycle of the capacitor 18. During the following cycles, the positive-going portions of the signals from the rectifier network 29 periodically place the controlled rectifier 20 in a conductive state so that the capacitor 32 is charged during the conductive periods of the rectifier 20 and is partially discharged to the capacitor 18 during the nonconductive periods. The capacitor 18 is also charged through the elements 40 and 42 during the conductive periods of the rectifier 20. When the capacitors 18 and 32 are fully charged, the rectifier 20 is no longer placed in a conductive state by the pulsating voltage supplied by the bridge network 29, and the control circuit 10 remains in this condition until the contacts 16 are next momentarily operated to discharge the capacitor 48 into the gate electrode of the controlled conduction device 22.

Thus, the control circuit 10 includes the two controlled conduction devices or controlled rectifiers 20 and 22 for controlling the charging and discharging cycles of the capacitive means 18. The controlled conduction device 20 is periodically placed in a conductive state to start the charging of the capacitor by superimposing the pulsating signals supplied by the bridge network 29 on the potential to which the capacitor 18 is charged. The duration of this charging interval is determined by the time required to fully charge the capacitor 18. The controlled rectifier 22 is placed in conduction to terminate the charging cycle and to initiate the discharging cycle under the control of the switching means 16 and is rendered nonconductive to terminate the discharging cycle whenever the charge across the capacitor 18 dissipates to a point at which the pulsating signals from the bridge network 29 again regain control over the conductive state of the controlled rectifier 20.

The following listed types and values of circuit components provide a control circuit 10 for supplying an output pulse of as high as 200 peak amperes to the winding 12 for a duration of from 6 to 12 milliseconds.

However, it should be understood that many other types and values of circuit components can be used in other control circuits embodying the present invention.

| | |
|---|---|
| Capacitor 18 | 2000—10,000 μfd. |
| Rectifier 20 | General Electric Type C11B. |
| Rectifier 22 | Texas Instrument Type 41. |
| Diode 30 | Sarkes Tarzian Type 40J2. |
| Capacitor 32 | 500 μfd. |
| Resistor 34 | 7 K. |

| | |
|---|---|
| Resistor 36 | 270 ohms. |
| Diode 38 | IN536. |
| Inductor 40 | 6 mh. |
| Resistor 42 | 2 ohms. |
| Resistor 44 | 100 K. |
| Resistor 46 | 1 K. |
| Diode 47 | General Electric Type IN91. |
| Capacitor 48 | .02 μfd. |
| Resistor 49 | 270 ohms. |

FIG. 2 of the drawings illustrates one possible use for the control circuit 10 in a fastener driving system as a means for supplying energy to an electrically operated tacker or stapler indicated generally as 50. This stapler can be of the type disclosed and described in detail in the contemporaneously filed application of Richard H. Doyle et al., Serial No. 161,651, now Patent No. 3,141,171. This tacker or stapler 50 includes a fastener driving blade having a magnetic portion disposed within an axial opening in an operating winding or coil, such as the winding 12, that is disposed in a head portion 52 of the stapler 50. The body of the stapler 50 also carries a trigger actuated control switch corresponding to the switch means 16.

The portion of the control circuit 10 enclosed within the dashed line in FIG. 1 is disposed within a separate housing 54 and is adapted to be carried by the operator of the stapler 50, as on a belt, and is connected to the switching means 16 and the winding 12 on the tacker 50 by a flexible cable 56. The control circuit 10 within the housing 54 is energized by using the plug 14 to establish a connection to a source of alternating current energy. To permit the operator to control the input voltage to the circuit 10 and, thus, the voltage to which the capacitor 18 can be charged, the tapped secondary winding 28 of the power input transformer 24 is provided with a tap selecting means 56. This selecting means is actuated by a knob 58 (FIGS. 1 and 2) accessible externally of the housing 54 to permit manual adjustment by the operator.

Although the invention has been described with reference to a single embodiment thereof, it should be understood that numerous other modifications and embodiments of the invention can be devised by those skilled in the art that will fall within the spirit and scope of the principles of this invention.

What is claimed as new and desired to be secured by Letters Patent of the United States is:

1. A circuit for supplying energy to a load comprising a potential source, first capacitive means, a first controlled conduction device for connecting said first capacitive means to said potential source, a second controlled conduction device for connecting said first capacitive means to said load, means controlled by the potential across said first capacitive means for controlling the conductivity of said second controlled conduction device, second capacitive means connected to said potential source by said first controlled conduction device and isolated from the load, and means including a conductive path through the second controlled conduction device for connecting both said first and second capacitive means in series with the first controlled conduction device for controlling the conductivity of said first controlled conduction device.

2. A circuit for supplying energy to a load comprising a potential source, capacitive means, a first controlled conduction device for connecting said capacitive means to said potential source, a second controlled conduction device for connecting said capacitive means to said load, means for placing said second controlled conduction device in conduction to connect said capacitive means to said load, and circuit means including the conductive path through said second controlled conduction device for connecting the capacitive means to the first controlled conduction device to inhibit conduction through the first controlled conduction device until the potential across said capacitive means drops to a given value.

3. A circuit for supplying energy to a load comprising a potential source, capacitive means, a first controlled conduction device for connecting said capacitive means to said potential source, a second controlled conduction device for connecting said capacitive means to said load, means for placing said second controlled conduction device in a conductive state to connect said capacitive means to said load, and circuit means including a conductive path through said first controlled conduction device for placing said second controlled conduction device in a nonconductive state.

4. A control circuit comprising a potential source, capacitive means, a first controlled conduction device having a control electrode, first circuit means including the first controlled conduction device for connecting said potential source to said capacitive means to charge said capacitive means, a second controlled conduction device for discharging the capacitive means, means for placing the second controlled conduction device in a conductive condition to discharge the capacitive means, and second circuit means including a conductive path through the second controlled conduction device for coupling said capacitive means to the control electrode of the first controlled conduction device so that the conductivity of the first controlled conduction device is varied in accordance with the potential across said capacitive means.

5. A circuit for supplying energy to a load comprising a potential source, first capacitive means, means for connecting said potential source to said capacitive means to charge said capacitive means, a controlled conduction device including a control electrode, first circuit means including said controlled conduction device for connecting said first capacitive means to said load, second capacitive means, circuit means for charging said second capacitive means to a potential corresponding to the potential to which said first capacitive means is charged, and normally nonconductive switching means operable to a conductive state for connecting said second capacitive means to said control electrode so that the controlled conduction device is controlled to connect said first capacitive means to said load in accordance with the potential to which said first capacitive means is charged.

6. A control circuit comprising a potential source; capacitive means; a first controlled conduction device having a control electrode; first circuit means including said first controlled conduction device for connecting said potential source to said capacitive means to charge said capacitive means to a given potential; a second controlled conduction device; a winding; second circuit means including said second controlled conduction device for connecting said capacitive means to said winding; control means for placing said second controlled conduction device in a conductive state; and means for controlling the conductivity of said first controlled conduction device including third circuit means connecting said control electrode to said potential source, and fourth circuit means including a conductive path through said second controlled conduction device for connecting said control electrode to said capacitive means.

7. A circuit for supplying energy to a load comprising a potential source, capacitive means, a first controlled conduction device having a control electrode, first circuit means including said first controlled conduction device for connecting said capacitive means to said potential source, second circuit means including a voltage dividing network connected to said source and to said control electrode for placing said first controlled conduction device in a conductive state to charge said capacitive means, a second controlled conduction device, third circuit means including said second controlled conduction device for rendering said capacitive means effective to discharge through said load, said second controlled conduction device normally being in a nonconductive state to permit the charging of said capacitive means for said potential source, said third circuit means including means for supplying said second controlled conduction device with a potential corresponding to the potential to which said capacitive means is charged to place said second controlled conduction device in a conductive condition in which said capacitive means discharges through said load, and circuit means connected to the first controlled conduction device and responsive to the establishment of a conductive condition in said second controlled conduction device for placing said first controlled conduction device in a nonconductive state.

8. A circuit for applying energy derived from a pulsating potential supply to a load comprising capacitive means, a first rectifier for connecting the capacitive means to the potential source to charge the capacitive means with a potential of a given polarity, a second rectifier including a gate electrode for connecting the capacitive means to the load, means connected to the gate electrode of the second rectifier for placing the second rectifier in conduction to discharge the capacitive means through the load, and circuit means including a conductive path through the second rectifier for applying the potential to which the capacitive means is charged to the first rectifier in a reverse bias direction to prevent conduction through the first rectifier.

9. The circuit set forth in claim 8 in which the first rectifier includes a gate electrode, and which includes means for applying a potential to the gate electrode of the first rectifier representing the potential to which the capacitive means is charged.

10. A circuit for applying energy derived from a potential source to a load comprising capacitive means, a controlled conduction device operable to connect the capacitive means to and disconnect the capacitive means from the potential source to selectively charge the capacitive means, a unidirectional conducting device for connecting the capacitive means to the load, and circuit means responsive to the operation of the controlled conduction device to connect the capacitive means to the potential source for applying a reverse bias to the undirectional conducting device.

11. The circuit set forth in claim 10 in which the controlled conduction device comprises rectifier means, and which includes additional circuit means responsive to the connection of the capacitive means to the load for applying a reverse bias to the rectifier means.

12. A control circuit for use with a load comprising a potential source supplying a pulsating signal, capacitive means, a first controlled conduction device having a control electrode, first circuit means including the first controlled conduction device for connecting the capacitive means to the potential source to charge the capacitive means, a second controlled conduction device connected to the capacitive means for connecting the capacitive means to the load, second circuit means including a conductive path through the second controlled conduction device for coupling the capacitive means to the control electrode to apply a control signal to said control electrode that is proportional to the potential to which said capacitive means is charged, and third circuit means connected between the control electrode and the potential supply for superimposing the pulsating signal from the potential supply on the potential representing the level of charge of the capacitive means.

References Cited by the Examiner

UNITED STATES PATENTS

| 2,428,390 | 10/1947 | Smith | 320—1 |
|---|---|---|---|
| 2,716,211 | 8/1955 | Aas | 320—1 |
| 2,942,169 | 6/1960 | Kalfaian | 320—1 |

TERRELL W. FEARS, *Acting Primary Examiner.*

IRVING SRAGOW, BERNARD KONICK, *Examiners.*

M. S. GITTES, R. J. McCLOSKEY, *Assistant Examiners.*